US008364695B2

(12) United States Patent
Berkowitz et al.

(10) Patent No.: US 8,364,695 B2
(45) Date of Patent: Jan. 29, 2013

(54) ADAPTIVE E-PROCUREMENT FIND ASSISTANT USING ALGORITHMIC INTELLIGENCE AND ORGANIC KNOWLEDGE CAPTURE

(76) Inventors: Gary Charles Berkowitz, Centennial, CO (US); Charles Christopher Wurtz, Los Alamos, NM (US)

( * ) Notice: Subject to any disclaimer, the term of this patent is extended or adjusted under 35 U.S.C. 154(b) by 283 days.

(21) Appl. No.: 12/004,810

(22) Filed: Dec. 22, 2007

(65) Prior Publication Data
US 2009/0094227 A1 Apr. 9, 2009

Related U.S. Application Data

(60) Provisional application No. 60/876,687, filed on Dec. 22, 2006.

(51) Int. Cl.
*G06F 17/30* (2006.01)
(52) U.S. Cl. ...................................................... 707/768
(58) Field of Classification Search .......... 707/713–721, 707/999.003–999.007, 765, 766, 767
See application file for complete search history.

(56) References Cited

U.S. PATENT DOCUMENTS

| | | | |
|---|---|---|---|
| 7,260,780 B2 | 8/2007 | Ma | |
| 7,668,811 B2 | 2/2010 | Janssens et al. | |
| 2003/0061122 A1* | 3/2003 | Berkowitz et al. | 705/27 |
| 2003/0167409 A1 | 9/2003 | Sussman | |
| 2004/0030694 A1 | 2/2004 | Tokumo et al. | |
| 2004/0128155 A1* | 7/2004 | Vaidyanathan et al. | 705/1 |
| 2004/0205751 A1 | 10/2004 | Berkowitz et al. | |
| 2004/0254870 A1 | 12/2004 | Chitaley et al. | |
| 2005/0049938 A1 | 3/2005 | Venkiteswaran | |
| 2005/0193029 A1 | 9/2005 | Rom et al. | |
| 2005/0222987 A1* | 10/2005 | Vadon | 707/3 |
| 2005/0273706 A1 | 12/2005 | Manber et al. | |
| 2005/0289168 A1 | 12/2005 | Green et al. | |
| 2006/0150098 A1* | 7/2006 | Ma | 715/542 |
| 2008/0027830 A1 | 1/2008 | Johnson et al. | |
| 2008/0040220 A1 | 2/2008 | Levy et al. | |
| 2008/0059297 A1 | 3/2008 | Vallier et al. | |

OTHER PUBLICATIONS

Yves Rasolofo, Term Proximity Scoring for Keyword-Based Retrieval Systerms, ECIR 2003, Springer-Verlag Berlin Heidelberg p. 207-218.*

* cited by examiner

*Primary Examiner* — Thu-Nguyet Le

(57) ABSTRACT

The present invention is a real-time intelligent find-assistant that suggests useful search terms to a buyer shopping an electronic catalog, as they progress in their online journey to find a particular item for potential purchase. In contrast to current approaches, the present invention uses an adaptive algorithm to extract and rank-order possible search terms from candidate vendor catalog pages, based upon a measure of relevance, or utility, derived from the proximity of possible non-generic terms in the vendor catalog to the terms already selected by the user in their current search. Also in contrast to current approaches, the invention captures and stores buyers' entire history of choices over time (even years), and uses this knowledge to make increasingly useful suggestions to a buyer as to what item descriptions to look for, as they progress through their search, thus allowing an organization to leverage expert purchasing behaviors for use by novice buyers.

3 Claims, 10 Drawing Sheets

FIG. 4

Step 2: Select descriptions from Search Assistant

Your Search Path pen found 386 items.
To Reduce Results select descriptions from Search Assistant.

Navigate Up and Down Your Search Path:
· pen (0 purchased, 386 found)

View Results

Search Assistant - Available Descriptions
[Select]

ink (87 %)
ball (80 %)
retractable (49 %)
roller (23 %) %)
gel (15 %)
liquid (13 %)
permanent (10 %)
medium (9 %)
fine (7 %)

sort alphabetically

Or add your own descriptions to Search Path:
[        ] [Add]

FIG. 5

Step 2: Select descriptions from Search Assistant

Your Search Path pen, finepoint found 1 items.
To Reduce Results select descriptions from Search Assistant.

Navigate Up and Down Your Search Path:
- pen (0 purchased, 386 found)
  - finepoint (0 purchased, 1 found)

[View Results]

Search Assistant - Available Descriptions
[Select]

```
- double click to select -
correction (100 %)
ink (100 %)
box4 (100 %)
markers (100 %)
236.915 (100 %)
permanent (100 %)
stabilo (100 %)
writing (100 %)
``` sort by relevance

Or add your own descriptions to Search Path:
[            ] [Add]

FIG. 8

Exact Matches Found

Exact Matches for: ニチバン

Your colleagues have successfully purchased
from the following Paths:

Shiseidou, ニチバン
ニチバン

Or click on a Exact Match found:

Narrow Results with Search Assistant

" ニチバン " was found in 146 items.
To narrow your search results, select words from the Search Assistant that best describe your item.

Your Search Path:
- ニチバン (1 purchased, 146 found)

View Results

Search Assistant
Select or type description below

```
533-422
nichiban (100 %)
ラベル (24 %)
ンデッ (12 %)
ビニールテー (10 %)
ロテー (7 %)
ラフトテー (4 %)
ラミネート (4 %)
バーフ (2 %)
``` sort alphabetically
Type your own description:

[          ] [Enter]

ADAPTIVE E-PROCUREMENT FIND ASSISTANT USING ALGORITHMIC INTELLIGENCE AND ORGANIC KNOWLEDGE CAPTURE

CROSS-REFERENCE TO RELATED APPLICATIONS

This application claims benefit of, and incorporates by reference in whole, the provisional application:
An Adaptive e-Procurement Find Assistant Using Algorithmic Intelligence and Organic Knowledge Capture
Application No. 60/876,687, Filing Date Dec. 22, 2006,
Inventors: Gary C. Berkowitz & Charles C. Wurtz.
This application claims benefit of the prior filed co-pending applications:
Knowledge-based e-catalog procurement system and method
Application Ser. No. 10/215,109 Filing Date Aug. 8, 2002
Inventors: Gary C. Berkowitz, D. Serebrennikov, B. M. Roe, C. C. Wurtz
Virtual Supercomputer
Application Ser. No. 10/821,582 Filing Date Apr. 9, 2004
Inventors: Gary C. Berkowitz & Charles C. Wurtz.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

This application incorporates by reference, in whole, the material contained in the computer program listing appendix submitted with this application on two (2) identical copies of a CD-R (read only) compact disc, containing one (1) file, named
ASSIST Code Implementation—Utility USPTO.txt.

BACKGROUND OF THE INVENTION

1. Field of the Invention

The present invention is directed toward the field of electronic procurement systems. More specifically, the technology described in this provisional patent application relates to a method and system for an e-catalog procurement assistant that combines artificial intelligence and evolving knowledge capture.

2. Description of the Related Art

A pending utility patent application (Knowledge-based e-catalog procurement system and method, U.S. Ser. No. 10/215,109) provides a solution to one of the fundamental problems of B2B Internet commerce, which is the ability to electronically shop a heterogeneous mix of vendors, or suppliers, whose catalog contents appear in a variety of formats, and further, the ability of an organization to capture and store the shopping patterns and choices of its buyers (shoppers), and to make this evolving knowledge available to the entire organization.

The present invention augments this approach with a real-time intelligent find-assistant that suggests useful search terms to a buyer, as they progress in their online journey to find a particular item for potential purchase.

Current technologies, such as used by Amazon, Google, and similar services, generate suggestions or recommendations based merely on recent previous viewing or purchase choices made by a buyer, or a group of buyers. That approach suffers from at least two disadvantages. First, no information is captured about a buyer's 'chain of reasoning' in their search. Thus, suggestions are made on the basis of only the final result. Second, suggestions are not made throughout the buyer's search, but only at the beginning.

In contrast, the present invention captures and stores buyers' entire history of choices, and uses this knowledge, in conjunction with an adaptive algorithm for selecting suggested search terms from candidate vendor catalog pages on the basis of relevance to the terms previously used by buyers, to make increasingly useful suggestions to a buyer as to what item descriptions to look for, as they progress through their search.

BRIEF SUMMARY OF THE INVENTION

The present invention, named the Organic Find Assistant, employs several unique features.

First, an adaptive artificial-intelligence algorithm extracts and rank-orders possible search terms from candidate vendor catalog pages, based upon a measure of relevance (utility) derived from the proximity of possible non-generic terms in the vendor catalog to the terms already used by the buyer (shopper) in their current search.

Second, the entire history of terms used by the current buyer—and previous buyers—along their search journey, and also from their previous successful outcomes (purchases made), is used by the intelligent algorithm to select additional terms for review. This evolving knowledge store is termed 'organic', analogous to the way biological organisms capture, store and cull previous experiences.

Third, the Organic Find Assistant works in all languages, both phonetic (European) and ideographic (Asian). It can combine single-byte character-set data with double-byte character set data within a single user interface, which allows the user to access all search functionality within their own native language, even if it is a double-byte character-set data language, such as Asian or Middle-Eastern languages. Further, for organizations that do not support Unicode and yet require the use of languages such as Japanese and Chinese, the Find Assistant provides three solutions: (a) capturing graphic (JPEG) images of the language characters and embedding the images directly in the purchase order, (b) aligning the ASCII byte encoding with the double-byte encoding of the language, and (c) removing the double-byte characters from the electronic purchasing order, and restoring them on the other end of the transaction.

Fourth, by capturing and storing individual purchasing behaviors over time (even years), and making this knowledge available to the entire organization, the Organic Find Assistant allows the organization to leverage expert purchasing behaviors for use by novice buyers.

Fifth, by incorporating institutional purchasing policies and in-house permissioning control, the Organic Find Assistant allows organizations to filter and partition their store of purchasing knowledge, thereby enabling the maintenance of confidentiality and preventing data-mining by unauthorized third parties.

BRIEF DESCRIPTION OF THE DRAWINGS

FIG. 4 is a display capture that shows the screen that displays the first time a user searches for a pen.

FIG. 5 is a display capture that shows how the user narrows his search to one item by selecting the s second word, "finepoint", from the Search Assistant box that displayed 386 results for "pen".

FIG. 8 is a display capture that shows how the Assist Function knowledge capture and artificial intelligence components also support double-byte character sets, such as Japanese.

FIG. 9 is a display capture that shows how the fusion of artificial intelligence and knowledge capture in the Search Assistant supports double-byte character sets (Japanese in this example).

DETAILED DESCRIPTION OF THE INVENTION

Figure 1:
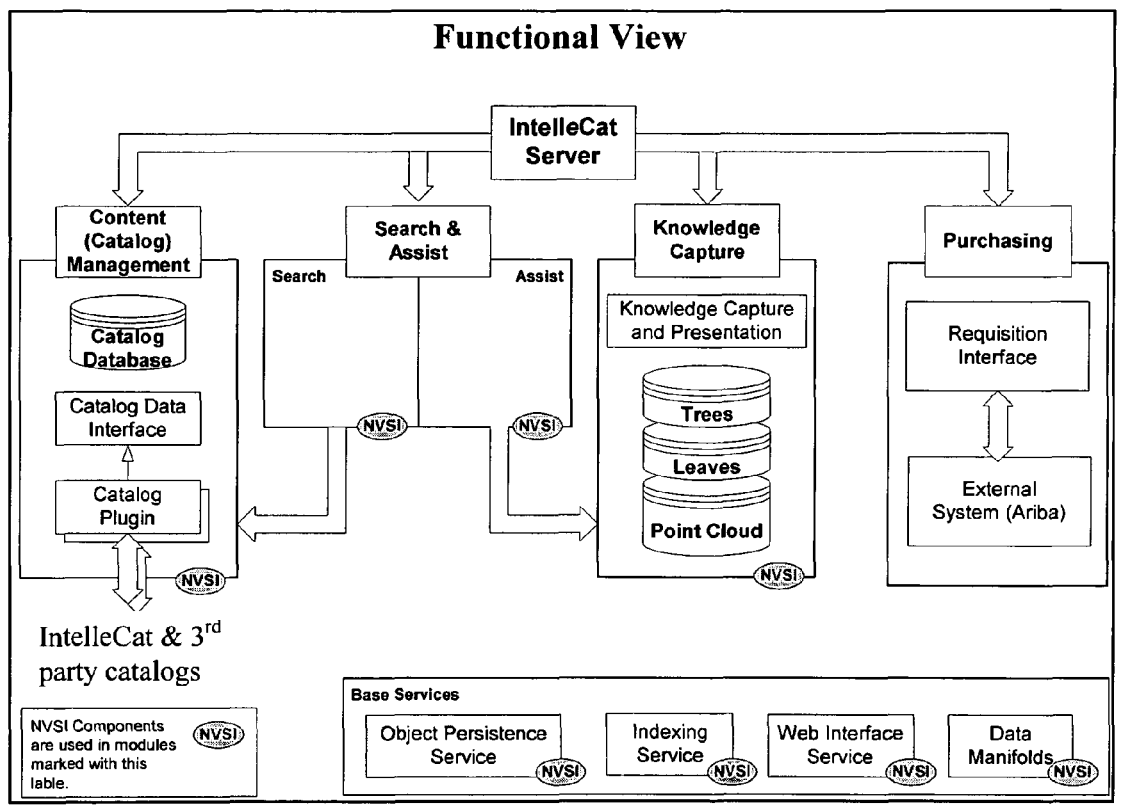
FIG. 1 is a schematic block diagram representation of the software architecture comprising the present invention.

This section provides a detailed functional and technical description of the method and system named Organic Find Assistant (also termed the Search Assistant, the Assist Function, or simply ASSIST), which is the preferred embodiment of the present invention, and is a component of a product named IntelleCat, a patent-pending knowledge-based e-catalog procurement system (Knowledge-based e-catalog procurement system and method, U.S. application Ser. No. 10/215,109).

By way of explicating the origin and development of the Assist function, the first version of the ASSIST Algorithm follows.

A. Functional Overview.
  Level 0:
    Given a set of selected documents (parent set)
    Display a list of terms to the user such that
    Allow user to pick a term that would take them to the next level of drill-down.
  Level 1:
    Subset of the parent set such that
    It excludes maximum number of irrelevant documents from parent set
    Retains maximum number of relevant documents from parent set.
Therefore: Assist Term Preferences
  Prefer those that are domain specific
  Prefer those that exclude the most documents from parent set.
B. Relevant Terms Heuristic.
  Level 0:
    Generic terms are less relevant.

The more generic the term, the more its usage pattern within the parent set similar to its usage pattern in the entire collection.

If the frequency with which the term is found in the parent set is greater than the frequency with which it is found in the entire collection, this means that the current term vector statistically implies this term, in other words the term is specific to the domain carved out by the request to some degree.

If the Parent Set Frequency (PSF) equals to the Collection Frequency (CF), the term is neutral. If PSF>>CF, the term is very domain-specific. If PSF<<CF, the term is purely accidental in this domain.

Neither PSF, nor CF of any term under consideration is ever 0.

We evaluate frequency of the term by counting the number of documents containing it, rather then the total number of instances.

Therefore, relevance coefficient (R) is:
  R=PSF/CF
  PSF=N(PS, T)/N(PS)
  CF=N(C, T)/N(C)
  N(PS, T)—number of documents in Parent Set that contain term T
  N(C, T)—number of documents in the Collection that contain term T
  N(PS)—total number of documents in the Parent Set
  N(C)—total number of documents in the Collection
Notes:
  The heuristic works for terms that have a reasonably large number of occurrences in the entire collection
    Rare terms tend to produce false positives when their majority gets included in the Parent Set by accident rather then by meaning.
    This means when a term with large N(C, T) is implied by the parent set, it is more significant than when a term with a smaller N(C, T) is implied in the same way.
    We'll model this by squaring the N(PS, T)

$$R=[N(PS,T)^2/N(C,T)]*[N(C)/N(PS)]$$

However, this has a bad side effect where terms with high counts but low ratio tend to score higher then terms with lower counts but higher ratios Experimentally, the following formulas produce increasingly better results:

$$R=[N(PS,T)^3/N(C,T)^2]*[N(C)/N(PS)]$$

$$R=[N(PS,T)^4/N(C,T)^3]*[N(C)/N(PS)]$$

$$R=[N(PS,T)^5/N(C,T)^4]*[N(C)/N(PS)]$$

Level 1:
  Filter input docs by relevance.
  Compute Avg Min Proximity (AMP).
  Exclude AMP>3 (configurable).
  Sort by Document Hit Count, descending.
  Present to user in scrolling window-segment.
The following explicates an architectural overview of the Assist function.

FIG. 1 shows a high-level functional diagram of IntelleCat, the system within which the Assist Function operates.

Search and Assist are the key functions through which users (shoppers) find catalog items. 'Search' refers to the overall component of using keywords to search the catalog index and semantic trees for products, view search results and select items to be added to a requisition. 'Assist' refers to the specific search component that assists shoppers in determining search terms relative to their current search context.

Figure 2:
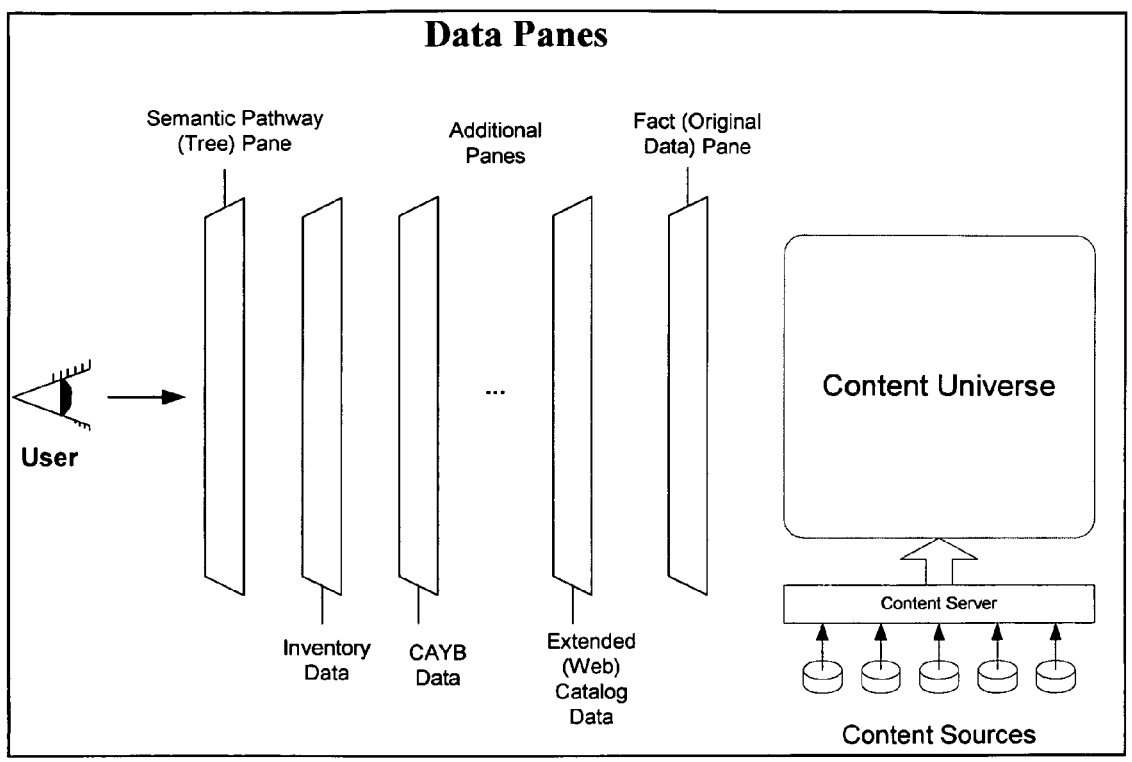
FIG. 2 is an illustration of the overlying "panes" that comprise the user's perspective on the data.

The Point Cloud Manifold provides the mechanism for establishing a logical connection between different types of catalog item information. The Point Cloud can be thought of as a logical 'push pin' that attaches several notes to a specific point on a wall, where the point on the wall is the item content as it was originally made visible to IntelleCat, and the notes are additional pieces of item-related information that may evolve over time. FIG. 2 illustrates this concept.

The Fact Plane represents the Catalog Manager's first view of a content source. The other data panes represent additional data that is accumulated through various additional data sources. The view presented to the end user (via catalog searching and purchasing) the result of the 'growth' of data relationships.

The "Document Universe" supported by a Content Server, with two or three (or more) Knowledge Panes layered between the user and the universe. The lowest (right-most) pane is the Fact Pane, where we identify individual documents from the Document Universe. This could be thought of as a point-cloud manifold. This is a baseline that connects the rest of the panes to the amorphous and changing document universe.

The second pane is the Annotation Pane. A number of annotations can be placed there—Xrefs, item corrections, captured items, enhancements.

The third pane is the Semantic Pathway Pane. It records relationships between combinations of semantic tokens and facts from the Fact Pane. This is where the IntelleCat trees (knowledge capture) go.

The idea is that a user is given a set of tools to explore the Document Universe with. One of the tools is the IntelleCat "Search", another is the IntelleCat "Search Assistant". The tools allow the user to query the universe based on a combination of "query terms" and expressions composed from them. This query language is application-specific but it certainly includes search terms, as we know them in IntelleCat.

Assist, from this point of view, is a way to take a query expression, apply it to the document universe, and produce a set of possible modifications to the query expression that are likely to be useful to the user in finding what they are looking for.

As the user explores the document universe using the IntelleCat Search and the IntelleCat Search Assistant cycle, they find what they are looking for. When they indicate to IntelleCat that they have found a document, IntelleCat at that time "pins" the document to the Fact Pane, and records the semantic pathway derived from the current search expression onto the Semantic Pathway Pane. It may also record any annotations onto the Annotation Pane (annotations can be added later). The following knowledge is captured by this act:

(Fact Pane) at some point in the past there existed a given document in the Document Universe.

(Pathway Pane) a given user has chosen this document as a result of their search query (separating it from all other documents selected by the same query from the Document Universe).

This automatic knowledge capture is a distinct aspect of the IntelleCat application. At some future time, the same or different user is offered the paths recorded in the Pathway Pane and encouraged to choose them rather than create new ones. This helps people find things and encourages clustering of the paths. (The old example of footpath across a campus lawn—everyone is free to choose any path they like, but soon a small number of well-trotted paths emerge in just the right places.)

This organic emergence of best practices is another distinct aspect of the IntelleCat application.

As the new users are following paths captured in the Pathway Pane, IntelleCat presents entries from the Fact Pane that other users have found useful when following the same paths. This also promotes automatic clustering, but this time it is not the clustering of paths people take, but a clustering of things people choose from the universe. If the search operation on the document universe is expensive, this has an additional benefit of allowing users to save time (or other resources consumed by the search operation) by using results of searches previously done by other users. However, this is not the main benefit of this feature. The main benefit is that out of all of the potentially relevant documents that exist in the universe, a small subset is "highlighted" as potentially more relevant. This is information that could not be derived form the search query alone. It comes about because of capturing selections of prior users following the same pathway (knowledge capture).

The most expensive operation in searching is not the mechanical query execution but mental evaluation of the presented results. It is expensive in terms of time but also in terms of effort. This is human time and human effort, which cost much more money than computer time saved by faster mechanical query execution. The automatic selection clustering offered by IntelleCat saves this time and effort (regardless of how fast the actual mechanical query execution might be).

This automatic selection clustering is yet another distinct aspect of the IntelleCat application.

A functional description of Assist follows. By navigating a product tree, the user selects the item they would like to purchase. The user specifies a 'root' term that describes their item, e.g. 'pump'. The user can then select from a list of previously stored 'secondary' terms or they may enter their own terms. In this way, the user builds or navigates branches of the tree. The terms associated with each branch are used to create a catalog search screen. The more branches there are, the more terms there are in the search string, corresponding to a more specific search. A sufficiently specific search will return just a few relevant items from all of the catalog items contained in the system.

As the user navigates down the branches of a tree, the system displays information indicating how specific the search is at the current branch. This information includes the total number of catalog items matching the current path, the number of products previously purchased at the current branch, and the number of products previously purchased that contain the current path (and some additional terms).

Figure 3:
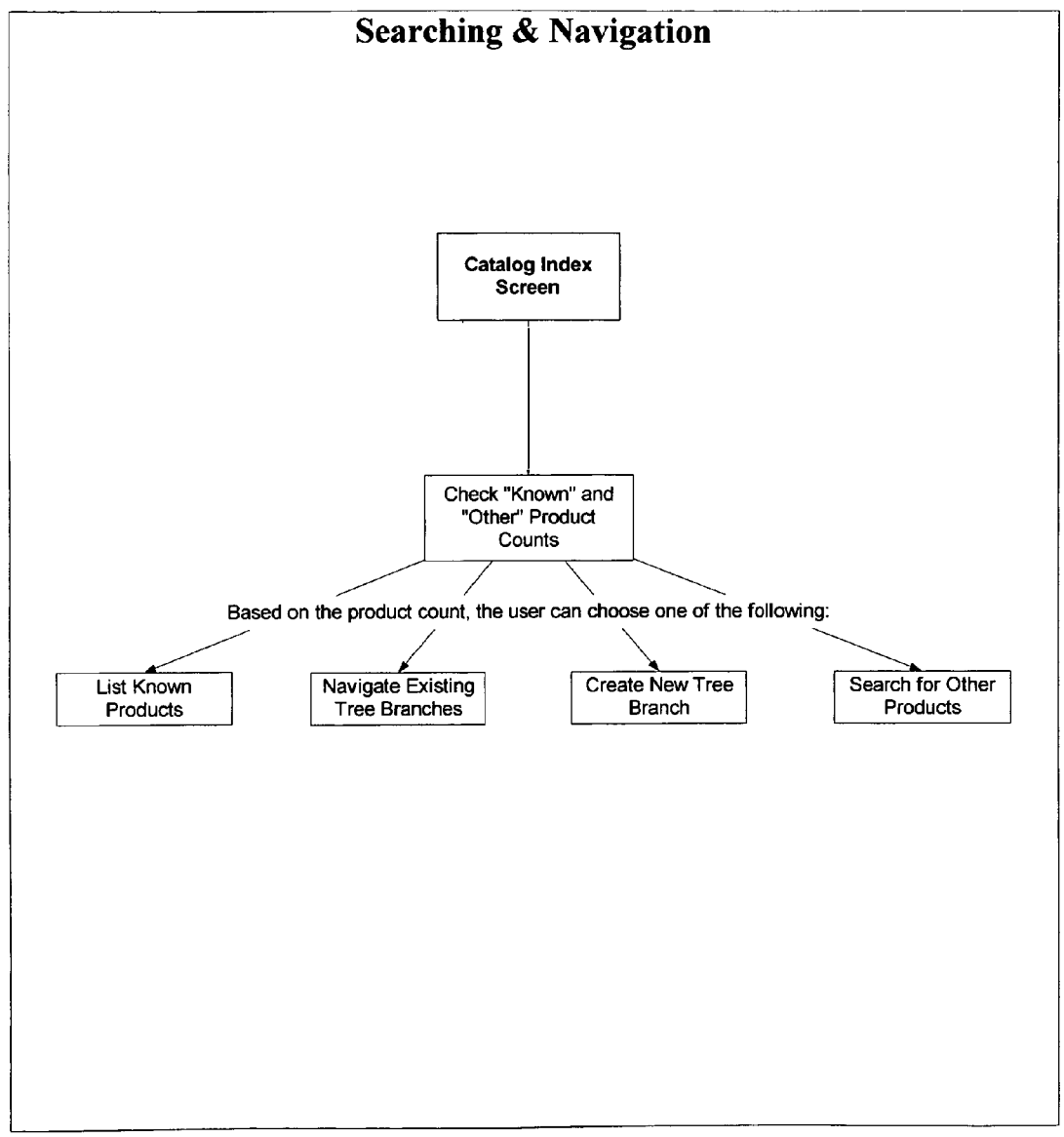
FIG. 3 is a diagram that describes the various functions supported by the Search, Assist and Navigation subsystem.

The Search, Assist and Navigation subsystem provides the user with an interface into IntelleCat's catalog repository and the repository of captured knowledge. FIG. 3 describes the various functions supported by the subsystem.

The Assist function aides the user in adding terms to their term vector in order to restrict a catalog search to fewer items. This function is typically used when a term vector produces too many search results, too few search results, or not useful results. When the user wants assistance in determining additional terms to add to their term vector they can use the Assist function.

IntelleCat knows that you are searching through descriptions of various items, the details of which may or may not be familiar to you. IntelleCat guides you through your company's catalogs by suggesting words that are related to the specific item that you are looking for. This is accomplished by means of the present invention, the Search Assistant. For example, if you need a folding table—but you are not sure which tables are approved for purchase—and you enter table, folding:

A standard search tool would show you, all of the items matching table and all of the items matching folding (including chairs, rulers, etc.), requiring you to review all of the item descriptions, until you found the item for which you are looking.

With the Search Assistant, when you enter 'table, folding', the Search Assistant suggests words that better describe the type of table that you might need, such as: lightweight, metal, saw, steel, etc. You then select or enter the words that most accurately describe the item that you are searching for in order to further narrow the search results.

The Search Assistant guides you to the items that you are searching for by suggesting additional words that further describe the targeted item.

The Search Assistant recommends words by listing them in a select box on the right side of the screen. As mentioned previously, terms from relevant knowledge capture bookmarks also appear in the Search Assistant. If a particular word that describes the desired item does not appear in the Search Assistant list box, you can type additional word(s) into the text input field on the bottom of the Search Assistant box, which if purchased from, is also be remembered as a bookmark, which is part of IntelleCat's unique knowledge capture component.

The Assist algorithm is used to determine the terms (attributes) within each catalog description that are displayed in the Assist list box. Its purpose (desired result) is to populate the Assist box with those terms that are most likely to be needed by a user to effectively narrow and complete their search.

The operating principal behind the algorithm is to select the terms across all found descriptions that, on average, are closest in physical proximity to the terms being searched (the terms already in the search path). The behavior of the algorithm can be modified to some extent by parameters that are set in the IntelleCat Application Properties file.

Properties file modifications: The Assist algorithm assumes that there are 5 different classes of terms:
(1) Alphabetical only
(2) Numeric only
(3) Mostly alphabetical (80%);
(4) Mostly numeric (80%)
(5) Mixed.
The Application Properties file can be set for how many search terms are to be displayed in the Assist box for each of the 5 classes of terms, based on the total number of catalog pages retrieved in the search.

For example, the Assist algorithm can be set to pull 3 terms to the left and right of each search term in the existing search path, but not to include purely numeric terms until there are less than 20 catalog pages retrieved by the search. The effect of this is that item numbers are not be displayed in the Assist box until the search path is already well defined.

Another example: Let's say the parameters in the Application Properties files are set to take the nearest 2 terms to the search terms. For the following description: "Rotary Vane Vacuum Pump with air-cooling system. Low maintenance, ideal for chemical spills," you would expect that if pump was the root term, that because the terms vacuum, vane and air-cooling are within two terms of the root term pump, they would therefore be selected by the Assist algorithm to be in the Assist box. Chemical and spills are too far away, and would therefore not be populated in the Assist box.

The assumptions in the above paragraph are true, if this description is the only description returned by the search. However, if 500 catalog descriptions are returned by the search, then the algorithm takes an average across all descriptions. Therefore, it is possible that over an average, chemical and spills would show up in the Assist box, and vacuum, vane and air-cooling would not (this is dependant on the characteristics of the data).

The initial search is typically too general to find specific items, so the search must be refined (extended). The user can select from a list of previously stored 'secondary' terms or they may enter their own terms. In this way, the user builds or navigates branches of the tree. The terms associated with each branch are used to create a catalog search screen. The more branches there are, the more terms there are in the search string, corresponding to a more specific search. A sufficiently specific search will return just a few relevant items from all of the catalog items contained in the system. As the user navigates down the branches of a tree, the system displays information indicating how specific the search is at the current branch. This information includes the total number of catalog items matching the current path, the number of products previously purchased at the current branch, and the number of products previously purchased that contain the current path (and some additional terms).

The Assist function aides the user in adding terms to their term vector in order to restrict a catalog search to fewer items. This function is typically used when a term vector produces too many search results, too few search results, or not useful results. Assist works by using the current search path words (one or more words or phrases) to search the catalogs for relevant words. Relevance is determined by a number of factors, including proximity to the current search path words and number of total occurrences.

Term Search refers to the IntelleCat capability to find search words or phrases within an existing search path. For example, suppose a user starts a search path with the word 'Turbomolecular' in an effort to find a turbomolecular vacuum pump. If there is already such a term in the tree space (saved via a previous successful purchase by IntelleCat's knowledge capture component) underneath the root 'pump', the user sees those matches.

Products are described using different languages, different language styles, by different vendors, in different catalog formats, and with varying degree of verboseness. Some product descriptions use very terse language, full of abbreviations. Others use very flowery descriptions, designed to make the product more appealing. Still others may use verbose, but purely technical descriptions full of specialized terminology and various specifications. This variation in product description is a fundamental problem in electronic purchasing, making it hard for end users to consistently be able to find desired items.

Assist helps users in determining appropriate additional search terms in order to restrict a catalog search to a reasonable number of appropriate items. This function is used when an existing term vector produces too many search results, or too few, or not useful results, and the user wants assistance in determining additional terms.

By clicking on the 'Assist' button, the user initiates an attribute search using the currently active term vector against the previously generated search index. The search results are processed using a variety of algorithms in order to produce a list of possible additional terms for the term vector. This information appears in a screen that allows the user to select zero or more Assist-suggested terms. The user is also able to manually type in a term. A user will typically use Assist when the nodes of the existing tree are not appropriate for the user's needs, or the user wants help in determining available search qualifiers.

The number of terms returned by Assist processing can range from zero to very large. The UI is able to handle a very wide range of results.

The following table contains definitions that are relevant to Assist processing.

TABLE 1

| | |
|---|---|
| Term | A component that can be made part of a Term Expression. This is typically a single word, but can also be parametric values. |
| Term Operator | An operator used to combine terms. Valid Term Operators are AND, OR, NOT, =, <, <=, >, >=, !=. |
| Term Expression | Any combination of terms combined using Term Operators. Note that a Term Expression is itself a Term. |
| Term Vector | A group of Term Expressions combined using only AND, OR and NOT operators. |
| Query | A request for information about a set of documents. Typically evaluated against a pre-computed index over this set of documents. |
| Index | A pre-computed data structure, that allows rapid execution of Search, Count and Assist queries. |
| Search Query | A query that selects a subset of documents that satisfies a Term Expression and a number of other constraints specified in the query (such as minimum score, maximum number of hits, etc.). Perhaps a better name for this would be "Select Query". |
| Selected Set | A set of documents produced by a Search Query given a particular Term Expression. Also referred to as Selected Document Set. |
| Drill-Down Term | A term that can be added to a Term Expression (TE1) to produce a new Term Expression (TE2), such that Selected Set of TE2 is a subset of the Selected Set of TE1, provided that other search constraints are identical. |
| Drill-Down Document Set | A drill-down document set of a term T on the term expression TE is a set selected by a new term expression TE2, where TE2 = TE AND T. The original document set selected by TE is called a Parent Document Set in relation to the Drill-Down Set. Expression TE is called a Parent Term Expression, and the expression TE2 is called a New Term Expression. |
| Count Query | A query that returns only the number of documents in the subset what would be returned from the Search Query, given identical Term Expression and the additional constraints. |
| Assist Query | A query that returns a list of Drill-Down Terms based on a Term Expression and a number of other constraints. |

'Drill-down' refers to the iterative, interactive process of constructing a Term Expression. A step in the drill-down cycle consists of presenting the user with a set of Assist terms, the user selecting one or more terms, adding these terms to the current term expression and displaying summary information about the resulting drill-down document set. This summary information includes the number of previously purchased items and other catalog products found using the new term expression.

By implementing this process interactively, the user is able to see intermediate results and iteratively adjust the term vector, eliminating some terms and adding others as necessary in order to achieve the desired search results. A 'perfect' drill-down is the process of constructing a Term Expression that leads the user to 'perfect' search results. The 'effectiveness' of a particular drill-down step can be measured in terms of how closely it comes to this ideal. Effectiveness can more tangibly be defined in terms of completeness and relevance.

A drill-down document subset is 100% complete when it contains all relevant documents from the parent document set. A drill-down document subset is 0% complete when it contains none of the relevant documents from the parent document set. A drill-down document subset is 100% relevant when it contains no irrelevant documents from the parent document set. A drill-down document subset is 0% relevant when it contains all of the irrelevant documents in the parent document set.

This means that a 100% complete set may also contain any number of irrelevant documents. And a 0% relevant set may also contain any number of relevant ones. This is in conflict with general usage of the term "relevance", but for now this is how we define these measures.

In IntelleCat, users are looking for documents that describe products they want to buy. A perfect IntelleCat term expression is one that selects all and only those documents that describe products the user is interested in. That is, the term expression is 100% complete and 100% relevant. The objective is to create a term expression that creates such a result set from the source document set.

We start out with 100% completeness and 0% relevance. During the drill-down process we strive to increase the relevance without reducing completeness. Suppose that we had a 100% complete term expression that used only AND operator, so that the selected set for this term expression would contain all of the relevant documents. Because the only operator we use is 'AND', every term in this term expression would have to exist in every relevant document. This is not true in the general case, as we can't assume that any given term will exist in all descriptions of a product. Product descriptions are notoriously inconsistent. Also, for a term expression to be 100% relevant it must contain no documents that are not relevant.

In order to simplify the first implementation of the search algorithm, we have chosen to use only 'AND' operators. As discussed, use of only the AND operator is good for increasing relevance but tends to reduce completeness. Therefore, our focus in the initial Assist algorithm is to increase relevance while minimizing the degradation of completeness.

There are a number of possibilities in regards to the effect on completeness. Suppose that the set of drill-down terms presented to the user contains only two terms (A and B):

Term A has 100% completeness, while Term B has 0%. This means that the first term is found in all relevant documents in the parent set and term B is found in none of them. Note, that this gives us no indication of the effect of these terms on the relevance, since term A can also be found in all of the irrelevant documents in the parent set and term B may not be found in only one of them (presumably, both terms must exist in a least one document in the parent set to appear in the drill-down list).

Terms A and B both have 100% completeness.
Again, they may have very different relevance effects.
Terms A and B both have 0% completeness.
This is also quite possible, it just means that both A and B are found strictly in irrelevant documents of the parent set.
Terms A and B have some non-zero and non-100% completeness.
This case has a number of sub cases, by the effect of both terms on completeness when they are combined using the OR operator into a single term. A OR B will always have completeness equal or greater to the separate completeness of A and B. Beyond that:
A OR B has 100% completeness
A OR B has completeness greater than max(compl(A), compl(B))
A OR B has completeness equal to max(compl(A), compl(B))
The choice between these two is governed by how disjoint is the selection of relevant documents from the parent set by A and B separately.

The algorithms to extract the suggested terms from the search results may become very sophisticated over time. In the initial algorithm, terms are suggested by searching the catalog index using the existing term vector, extracting keywords from the found pages and performing some filtering on the results to remove irrelevant words.

Finally, the first-pass Assist algorithm is as follows:
Execute query against catalog index using current term vector
Filter result documents by a configurable relevance threshold.
Extract text (words) from result documents
Process text to remove duplicates and "kill list" entries
Compute the Average Minimum Proximity (AMP) of processed text to term vector words.
Exclude AMP greater than a configurable threshold. (Ballpark of 3.0 works well).
Present results.

Note that the 'kill list' is a set of words that are generally not useful in searches, such as common prepositions.

The user can select one or more words from a list box that Assist presents, to add to the term vector. The results can be sorted in a variety of ways, including:
Relevance count, descending (default)
Relevance count, ascending
Alphabetical, ascending
Alphabetical, descending.

After the initial algorithm, a number of improvements have been made. This section describes a number of minor improvements that cumulatively provide a significant overall improvement to Assist.

The second pass of the Assist algorithm implementation adds the use of the OR operator to term expressions. The OR operator can help with completeness but not with relevance. If we have two relevant but insufficiently complete drill-down terms, we allow the user to combine these two terms into a single term using the OR operator, thereby (potentially) increasing the completeness but leaving the relevance at the level of the least relevant of the two. The degree by which the completeness improves depends on how disjoint were the two drill-down sets.

The completeness of Assist has also been improved by automatically expanding the term vector words with any known synonyms. For example, if the Master Dictionary knows that 'roughing' and 'backing' are synonyms, then the user-created term vector "pump AND roughing" is automatically be expanded to "pump AND (roughing OR backing)" during the search query.

In order to implement such functionality, the Master Dictionary contains the synonym information. It is required to contain some information regarding the domain under which the synonym is valid, and the search engine must be able to interpret this domain data.

Similar to synonym substitution is acronym and abbreviation expansion and/or substitution in the term vector during searching. The same requirements apply regarding Master Dictionary metadata and domain validity.

Assist utilizes NLP methods to determine which synonyms are relevant in the context of a given description. With acronyms, we might try to use domain-specific acronym dictionaries that are keyed by the classification of the entire catalog (into a site-specific catalog set like "Office Products") or by classification of individual items using UNSPSC codes where available.

While the initial algorithm processes all words individually, the secondary algorithm recognizes phrases that occur in the documents. For example, "lite beer" is recognized as a phrase that occurs in the documents, so it will appear in the Assist results as a unit, not the two separate words "lite" and "beer".

The secondary algorithm also implements parametric search capabilities. These parameters are not used when processing the document set returned by the query, but they are used in the query itself.

The following is an overview of the ASSIST algorithm, and noted improvements.
A. Stages of the Assist "Pipeline".
  1. Prepare—process Assist arguments
  2. Select Documents—run a search to find relevant documents
  3. Collect Terms
  visit some or all of the selected documents,
  extract term information,
  compute minimum proximity,
  collate & average the minimum proximity for all terms
  select terms based on term class, number of docs in search results, and proximity curves for the term class,
  keep stats about these terms.
  4. Summarize Stats
  5. Resolve Terms
  translate terms from integer ids to display strings (lookup)
  (also includes un-stemming).
  6. Display.
B. Change Summary from Version 1.
  Prepare:
  Changed how query and exclude terms are identified.
  Old method: terms were translated to their ids over and over for each document visited by Assist. New method: terms are translated to their ids once per on-line catalog.
  Select Documents:
  Cap the number of documents visited by the Assist algorithm to 200 top scoring docs out of all those found by the current term vector.
  Collect Terms:
  Switch to a different method of collecting term stats.
  Old method: as Assist visits documents, and selects appropriate terms from each, it forwards them to a "term collector". The old term collector maintained two arrays of integers, with one position for each unique term in that catalog (one such collector per on-line catalog). The term id was used as a direct offset into these arrays. One array for the count of times the term was found, another array for the sum of proximities with which it was found. At the end, the average proximity was computed for each term found.

New method: the new term collector uses a hashtable (key is term id). Each entry contains the two integers as before, but now there are only a few entries that are active at a time. This reduces memory use and GC.

Changed which terms are selected by Assist from each visited document.

Old method: all terms were sent to term collector. After all terms were collected, the average proximity of collected terms was compared to a series of cut-off conditions, based on the class of the term (all-alpha, numeric, etc.) and the number of documents found by the current term vector. If the average proximity passed the threshold for this class of terms, it was allowed to the next stage, otherwise the term was removed. One of the effects of this was to avoid showing detailed terms (like part numbers are sizes) when document count was large. New method: a single cut-off proximity value is defined in a config file (5 by default). Only terms that are this close to the nearest query term are taken from each document and sent to the term collector. If the number of documents returned by a query is over 100, only pure-alpha terms are allowed into the collector.

Summarize Stats:

Changed how Assist terms are selected for display.

Old method: all terms that passed previous checks were passed onto the next stage New method: put terms into a fixed length priority queue (default length 200) that keeps only the top scoring terms.

Changed how Assist terms from different catalogs are combined.

Old method: term numbers of equal terms from different catalogs are placed into a cross-reference map that is kept in memory. For each term, a primary catalog is assigned out of all catalogs where it occurs. This is done when putting catalogs on-line (causes a long delay). At query time, terms are checked against this cross-reference map and forwarded to the "primary" catalog. New method: no pre-computation occurs during putting catalogs on-line. Terms from different catalogs are treated as distinct up until they are resolved from integer ids to actual strings. At that time, they are stemmed again and terms with equal stems are combined into one using a hash table.

Changed how term exclusion works.

UI can pass a number of terms to exclude from the Assist. These are currently the bookmark terms that UI already has. Old method: the terms were removed at the final stage, after they have been collected and resolved. New method: the terms are removed before they are collected.

Resolve Terms:

Make size of the unstem cache configurable.

Avoid garbage creation when unstemming is done.

Changed how term enums are processed to avoid creation of intermediate Term objects when looking for terms matching some criteria.

Display:

Fixed % computation for the Assist list. It is now based on the number of documents actually visited rather than the total number of documents found.

Implementation details follow.

A. Two-Index Approach (First pass improvement)

1. Introduces two different additional termlist fields (Assist, Assist_quick).

2. Adds another list of fields to application.properties file to choose which fields are indexed for Assist (This adds a new capability that allows fields to be used in searching but to never appear in Assist).

3. Adds a "% Assist speedup" parameter that determines what % of the Assist words are placed into the Assist_quick field.

4. Adds a parameter to the AssistRequest object that selects "quick" or "full" Assist.

5. Instantiate two sets of pre-computed shared Assist implementation objects.

Parameterize these objects with the Assist field they read from (this expands load on the memory).

6. Parameterizes the rest of the Assist logic to select the field.

7. Selects which set of Assist pre-computed objects is used for a given query based on the parameter.

8. Makes UI call quick Assist automatically and display only the first N terms from it (N is equal to the height of the list box, so there is no scroll bar).

9. Adds a "More" button (think of a better name, something like "Try Harder") that provides more help.

10. Makes the button enabled only when quick Assist result is being shown.

11. Make the button re-run the page but call the full Assist and display the results.

B. TreeServer Caching (Second Pass Improvement)

1. When Assist is called on a public search path, ask TreeServer for the Assist list that it stores for that tree. If one is obtained, display it. Stored lists are marked as "quick" or "full".

If quick Assist is requested use the stored list if one exists. If a full Assist is requested, only use the stored list if it is full.

2. If no Assist list exists for the public path, call the actual Assist (quick or otherwise), send the result to the tree server for caching, and send it back to the caller.

3. Assist calls that do not refer to stored paths, are processed as before and their results are not cached.

4. Whenever the set of on-line catalogs changes (either catalogs are added/removed or their active versions change), send a message to TreeServer to invalidate ALL cached Assist lists.

5. Perform the same caching for "other product counts" in addition to the Assist lists. This removes the last requirement of running any kind of search during tree navigation.

C. TreeServer Pre-Caching (Third Pass Improvement)

1. After "invalidate" signal is sent to the TreeServer, an application-level background process is started that runs at a low priority and iterates over the stored paths in the TreeServer for each path that does not have a valid Assist list and product count, initiates a call to Assist (quick or full) and then sends the list to the TreeServer for storage 2. This process should be allowed some pause between catalog load activity finishing and it starting.

Otherwise, when a lot of catalog activity is happening, this would be running needlessly.

A set of screen flow captures demonstrate the essence of the fusion of artificial intelligence and knowledge capture in the Assist Function. FIG. 4 shows the screen that displays the first time a user searches for a pen. The Search Assistant box is populated purely via artificial intelligence with words that are actually found in the suppliers catalogs' items descriptions.

In FIG. 5, the user selects from the words suggested by the Search Assistant (via the artificial intelligence component) or types in their own description of the product they are looking for. In this example the first word of the user's Search Path is "pen" which was found in 386 items. By selecting the second word from the Search Assistant "finepoint" the user has selected down to 1 very specific pen product which they are looking for. The user goes on to purchase this product from this Search Path "pen, finepoint".

Figure 6:
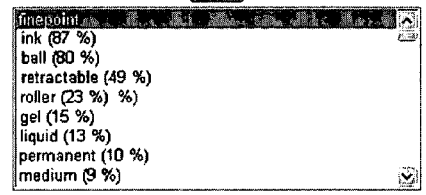
FIG. 6 is a display capture that shows how the next time the same user, or a colleague, searches for a pen, the knowledge capture component of the Assist Function has automatically saved the successful find path, "pen, finepoint", and the description "finepoint" for has now been automatically been promoted to the top of the Search Assistant list.

In FIG. 6, the next time the same user or a colleague searches for a pen, the knowledge capture component of IntelleCat has automatically saved the "pen, finepoint" Search Path as a previously purchased successful Search Path, and the description "finepoint" for the Search Path "pen", which has helped the previous user quickly find and purchase the item they were looking for, has now been automatically (by IntelleCat's knowledge capture component) promoted to the top of the Search Assistant list. The words after the knowledge capture "Bookmarks", such as "finepoint", are still selected via the artificial intelligence component of IntelleCat's Search Assistant, such as "ink" or "retractable". Thus, the Search Assistant as soon as users start using the system becomes a fusion of artificial intelligence and knowledge capture. It captures the knowledge of how a corporate department or a whole corporation buys items and shares this knowledge across the corporation/departments. The Search Assistant adapts to the company's usage and buying patterns. This is beneficial especially due to the repeat buying patterns in corporate purchasing. Also, the Search Path for "pen" now indicates that there has been "1 purchased" product from this Search Path.

Figure 7:
FIG. 7 is a display capture that shows how, when a user goes to "View Results" for a previously purchased Search Path, such as "pen, finepoint", the user can select "View Previously Purchased Products Only" for this Search Path, and see the product that has been previously purchased by themselves or a colleague from this Search Path.

In FIG. 7, when a user goes to "View Results" for a previously purchased Search Path, such as "pen, finepoint", the user can select to "View Previously Purchased Products Only" for this Search Path, and see the product that has been previously purchased by themselves or a colleague from this Search Path. This represents another aspect of the unique IntelleCat knowledge capture component.

In FIG. 8, the IntelleCat knowledge capture and artificial intelligence components also support double-byte character sets, such as Japanese as in the above screen capture. In this case a user searches for the Japanese term "ニチバン". The knowledge capture component of IntelleCat (as depicted on the left hand side of the screen capture above) shows the user that the term they are looking for has already led to a previous successful purchase by either themselves or a colleague, thus helping the user reduce the amount of time needed to find same or similar items over and over again.

In FIG. 9, the screen capture depicts the fusion of artificial intelligence and knowledge capture in the Search Assistant with double-byte character sets (Japanese in this example).

Figure 10:
FIG. 10 is a display capture that shows how the "View Previously Purchased Products" feature of the Assist Function supports double-byte character sets, mixed with single-byte character set words.

In FIG. 10, the knowledge capture component "View Previously Purchased Products" is displayed in this example with a double-byte character set Search Path and a product result with double-byte character set content. Assist also uniquely supports content with a mixture of double-byte character set words and single-byte character set words.

The detailed description of the present invention also incorporates by reference, in whole, the computer program listing appendix submitted with this application on CD-R discs, as referenced at the beginning of the Specification.

What is claimed is:

1. A computer-implemented method for creating a collection of terms to suggest, to assist in finding items in one or more electronic data stores, such that while extracting potential terms to suggest from said electronic data stores, wherein said potential terms are processed before being added to said collection of terms to suggest, said method operates in a manner whereby:

said collection of terms to suggest is shortened to a length specified by a configurable parameter denoting the percentage of terms collected that are to be presented;

said potential terms are added to said collection of terms to suggest only after filtering said potential terms by a variety of criteria, to include one or more of context-dependent relevance of said potential terms, threshold-dependent physical proximity of related terms, frequency of occurrence of said potential terms in said data stores, and exclusion of said potential terms matching those in a predefined list;

terms from said electronic data stores are translated to their corresponding term identifier only once per each said electronic data store;

said collection of terms to suggest uses a hash table array structure for storage and retrieval, with key as the term identifier;

said collection of terms to suggest is stored for a duration that exceeds the current search session, for later use in finding similar items in said electronic data stores.

2. A system for creating a collection of terms to suggest, to assist in finding items in one or more electronic data stores, the system comprising:

a first storage device for storing information retrieved from said electronic data stores;

a processor connected to the first storage device, wherein said processor is configured such that while extracting potential terms to suggest from said electronic data stores, wherein said potential terms are processed before being added to said collection of terms to suggest, said system operates in a manner whereby:

said collection of terms to suggest is shortened to a length specified by a configurable parameter denoting the percentage of terms collected that are to be presented;

said potential terms are added to said collection of terms to suggest only after filtering said potential terms by a variety of criteria, to include one or more of context-dependent relevance of said potential terms, threshold-dependent physical proximity of related terms, frequency of occurrence of said potential terms in said data stores, and exclusion of said potential terms matching those in a predefined list;

terms from said electronic data stores are translated to their corresponding term identifier only once per each said electronic data store;

said collection of terms to suggest uses a hash table array structure for storage and retrieval, with key as the term identifier;

said collection of terms to suggest is stored for a duration that exceeds the current search session, for later use in finding similar items in said electronic data stores.

3. A program product apparatus including a computer useable memory with computer program logic stored therein to enable, when executed by a computer system with an operating system, the performing of a method for creating a collection of terms to suggest, to assist in finding items in one or more electronic data stores, such that while extracting potential terms to suggest from said electronic data stores, wherein said potential terms are processed before being added to said collection of terms to suggest, said apparatus operates in a manner whereby:

said collection of terms to suggest is shortened to a length specified by a configurable parameter denoting the percentage of terms collected that are to be presented;

said potential terms are added to said collection of terms to suggest only after filtering said potential terms by a variety of criteria, to include one or more of context-dependent relevance of said potential terms, threshold-dependent physical proximity of related terms, frequency of occurrence of said potential terms in said data stores, and exclusion of said potential terms matching those in a predefined list;

terms from said electronic data stores are translated to their corresponding term identifier only once per each said electronic data store;

said collection of terms to suggest uses a hash table array structure for storage and retrieval, with key as the term identifier;

said collection of terms to suggest is stored for a duration that exceeds the current search session, for later use in finding similar items in said electronic data stores.

* * * * *